United States Patent
Schaemann et al.

(10) Patent No.: US 10,219,343 B1
(45) Date of Patent: Feb. 26, 2019

(54) PULSE MODULATION FOR ISOLATED AUXILIARY VOLTAGE AND DIMMING SIGNAL TRANSFER OVER SINGLE OPTO-ISOLATOR

(71) Applicant: Infineon Technologies Austria AG, Villach (AT)

(72) Inventors: Marcus Schaemann, Munich (DE); Tiam Poh Lau, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/896,397

(22) Filed: Feb. 14, 2018

(51) Int. Cl.
H05B 37/00 (2006.01)
H05B 33/08 (2006.01)

(52) U.S. Cl.
CPC ..... H05B 33/0848 (2013.01); H05B 33/0812 (2013.01); H05B 33/0824 (2013.01)

(58) Field of Classification Search
CPC ............ H05B 33/0848; H05B 33/0812; H05B 33/0824
USPC .......................................................... 315/186
See application file for complete search history.

(56) References Cited

U.S. PATENT DOCUMENTS

| | | | | |
|---|---|---|---|---|
| 7,616,455 | B2* | 11/2009 | Cameron | G05F 1/70 363/16 |
| 8,203,277 | B2* | 6/2012 | Grotkowski | H05B 33/0815 315/155 |
| 9,320,093 | B2* | 4/2016 | Tikkanen | H05B 33/0815 |
| 2012/0249004 | A1* | 10/2012 | Kamata | H05B 33/0818 315/206 |
| 2013/0221875 | A1* | 8/2013 | Liao | H05B 33/0851 315/307 |
| 2015/0312979 | A1* | 10/2015 | Vonach | H05B 33/0842 315/185 R |
| 2015/0334793 | A1* | 11/2015 | Maier | H05B 33/0845 315/153 |

OTHER PUBLICATIONS

"CDM10VD, Flexible 0-10V Dimming Solution," Infineon, V1.1, Aug. 2, 2017, 17 pp.

* cited by examiner

*Primary Examiner* — Don Le
(74) *Attorney, Agent, or Firm* — Shumaker & Sieffert, P.A.

(57) ABSTRACT

In an example, a controller that controls one or more light-emitting diodes (LEDs), wherein the controller is configured to receive an output voltage from a secondary transformer winding of a transformer, and receive first information across a galvanic isolation barrier, wherein the first information includes a desired LED brightness. The controller is further configured to receive second information across the galvanic isolation barrier, and the second information includes an output voltage of an auxiliary transformer winding; The controller may control the one or more LEDs based on the first information, and also control the output voltage of a secondary transformer winding and the output voltage of the auxiliary transformer winding based on the first information and the second information.

20 Claims, 7 Drawing Sheets

PULSE MODULATION FOR ISOLATED AUXILIARY VOLTAGE AND DIMMING SIGNAL TRANSFER OVER SINGLE OPTO-ISOLATOR

TECHNICAL FIELD

This disclosure relates a driver, such as a light emitting diode (LED) driver, that is configured to control a current or power supplied to a load device, such as a string of LEDs.

BACKGROUND

Drivers may control a current or power at a load device. For instance, an LED driver may control a current or power supplied to a string of LEDs. Some drivers may include an alternating current (AC) to direct current (DC) converter or a DC to DC converter. The converter may comprise a so-called a flyback converter, a buck-boost converter, a buck converter, a boost converter, or another type of AC to DC or DC to DC converter. Such AC to DC and DC to DC converters output a desired current or power at the load device. For instance, when operating a street lamp for projecting light in a high beam mode when pedestrians are present, the string of LEDs may operate at a higher current or power than when operating in a low beam mode when no pedestrians are present.

SUMMARY

In general, this disclosure is directed to techniques for a driver that permits a voltage supply using an auxiliary winding of a transformer in parallel to providing the output current or power to the load. For example, a driver may energize a primary winding of a transformer to charge a magnetic field of the transformer, which causes a secondary winding of the transformer to output a desired current or power at a load device, such as an LED. The transformer may provide electrical isolation between the primary and secondary-sides of the transformer for improved safety. Furthermore, a dimming circuit may be isolated from the primary-side of the transformer and also isolated from the secondary-side circuitry which delivers power to the load. The dimming circuit may be isolated from the rest of the system by a galvanic isolation barrier.

In an example, a controller that controls one or more LEDs may be configured to receive an output voltage from a secondary transformer winding of a transformer, receive first information across a galvanic isolation barrier, wherein the first information includes a desired LED brightness, and receive second information across the galvanic isolation barrier, wherein the second information includes an output voltage of an auxiliary transformer winding. The controller may be further configured to control the one or more LEDs based on the first information, and control the output voltage of a secondary transformer winding and the output voltage of the auxiliary transformer winding based on the first information and the second information.

In another example, a circuit is configured to generate a signal including first information and second information, wherein the first information includes a desired LED brightness, and wherein the second information includes an output voltage of an auxiliary transformer winding. The circuit is further configured to transmit the signal to a controller over a galvanic isolation barrier.

In another example, a system includes a primary transformer winding, an opto-isolator, a primary-side circuit, a load, a circuit, and a controller. The primary-side circuit is configured to provide a current to the primary transformer winding. The load may include one or more LEDs, and may be configured to be powered by a secondary transformer winding. The circuit may be configured to be powered by an auxiliary transformer winding. The circuit may include a regulator and a pulse-width modulator. The regulator may be configured to stabilize an output voltage of the auxiliary transformer winding, and the pulse-width modulator may be configured to accept a first information and a second information and produce a signal including the first information and the second information. The first information includes a desired LED brightness, and the second information includes an output voltage of the auxiliary transformer winding. The pulse-width modulator may be configured to transmit the signal to the controller via the opto-isolator. The controller may be configured to process the signal and regulate the power transfer to the secondary transformer winding and to the auxiliary transformer winding.

The details of one or more examples are set forth in the accompanying drawings and the description below. Other features, objects, and advantages will be apparent from the description and drawings, and from the claims.

DETAILED DESCRIPTION

Figure 1:
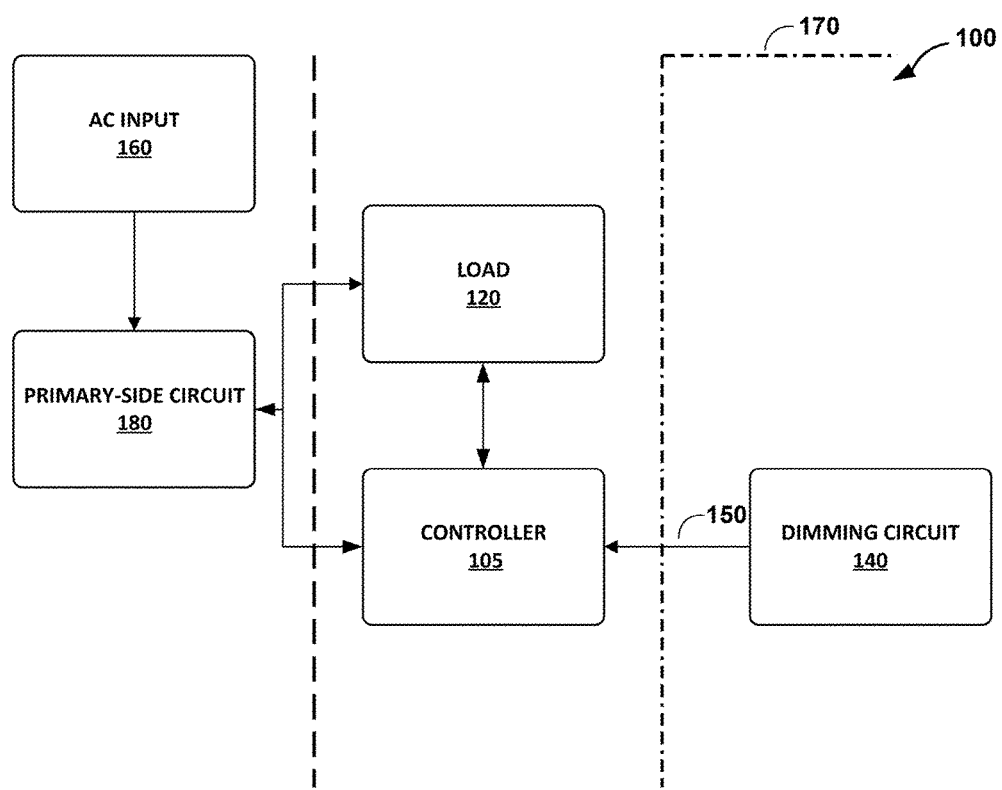
FIG. 1 is a block diagram illustrating an exemplary system for power supply and dimming control of a load, in accordance with one or more techniques of this disclosure.

Some systems may use an alternating current (AC) to direct current (DC) power converter or a DC to DC power converter to control a voltage output to a load device, such as a light emitting diode (LED) or a string of LEDs. In some applications, an isolated AC to DC or DC to DC converter, for instance, a flyback converter, is used to improve a safety of a resulting device. To provide the electrical isolation, a flyback converter uses separate windings of a transformer. For instance, a flyback converter may selectively energize a primary winding of the transformer to control a current or voltage output at a secondary winding of the transformer. Rather than directly measuring a current or voltage output at the secondary winding of the transformer, drivers may be configured to estimate a current or voltage output at the secondary winding using information on the primary-side, for instance an auxiliary winding or the current through the primary winding. For instance, a driver may determine a voltage output at the secondary winding according to a voltage at the secondary winding as modified by a winding ratio between the secondary and auxiliary windings. In some examples, LED lighting systems may be equipped with a dimming circuit configured to communicate a desired intensity of light emitted from the LED.

In order to improve safety in LED lighting applications, the dimming circuit may be configured to be separated from the rest of the system by a galvanic isolation barrier. Galvanic isolation is a technique by which parts of an electrical circuit may be isolated, wherein different ground potentials are assigned to isolated parts of the electrical circuit to decrease the risk of ground loops forming in the circuit. Ground loops in electrical circuits may be problematic, since current from flowing between two isolated parts of a circuit through a shared ground conductor may induce noise in electrical signals flowing through the circuit. Furthermore, galvanic isolation may protect users from exposure to high voltages in the dimming circuit. In one example, the dimming circuit may be galvanically isolated from the primary-side of the transformer, and the dimming circuit may also be galvanically isolated from the secondary-side circuitry configured to power the load. In this instance, the dimming circuit must transmit information across the galvanic isolation barrier to communicate with the rest of the electrical circuit.

Since electrical signals may not cross a galvanic isolation barrier, the dimming circuit may be configured to transmit information across the galvanic isolation barrier via an opto-isolator or another communication technique that does not use electromagnetic radiation. An opto-isolator, for example, may be configured to convert an electrical signal into a light signal, transmit the light signal across the galvanic isolation barrier, and restore the light signal to an electrical signal after the light signal has crossed the barrier. In some examples, the information transmitted by the dimming circuit may include first information and second information, and the first information and the second information may be encoded in a pulse modulation signal. The pulse modulation signal may include a duty cycle and a frequency; either the first information or the second information may be encoded in the duty cycle and either the first information or the second information may be encoded in the frequency. In this example, the encoded pulse modulation signal may be transmitted across the galvanic isolation barrier to a controller via the opto-isolator.

In accordance with one or more techniques described herein, a controller may be configured to receive a pulse modulation signal encoded with the first information and the second information. The controller may be further configured to decode and process the first information and the second information. In this way, the controller may be configured to apply the first information and the second information to control other components of the power converter. For instance, the first information may include a dimming voltage value, and the controller may be configured to apply the dimming voltage value to define a current or power set point to control the brightness of the LEDs.

The output voltage of the auxiliary transformer winding configured to power the dimming circuit must remain relatively constant, even when the LEDs are consuming little or no power. In this scenario, the secondary windings of the transformer will have a very low output voltage, because the LEDs require a small amount of current when they are turned off or set to a low intensity. However, the auxiliary winding of the transformer must always continue to provide an adequate power supply to the dimming circuit. One way to ensure the steady output voltage of the auxiliary transformer winding may be to transmit the output voltage to the controller as the second information. In this example, the controller may be configured to apply the second information to maintain a steady output voltage of the auxiliary transformer winding, despite the output voltage of the secondary transformer windings. A steady output voltage of the auxiliary transformer winding not only may guarantee the functionality of the dimming circuit, it also may maximize the power consumption efficiency of the components of the dimming circuit. While the output voltage is certainly a viable candidate for the second information, the second information may include other parameters as well.

FIG. 1 is a block diagram illustrating an exemplary system 100 for power supply and dimming control of a load, in accordance with one or more techniques of this disclosure. As illustrated in the example of FIG. 1, system 100 may include controller 105, load 120, dimming circuit 140, signal 150, AC input 160, galvanic isolation barrier 170, and primary-side circuit 180.

Controller 105 may be configured to control load 120, wherein load 120 may include one or more LEDs. For instance, controller 105 may be configured to define a current set point or a power set point, wherein the set point determines the current or power delivered to load 120, which in turn may determine the light intensity output of load 120. In some examples, controller 105 may include an analog circuit. In some examples, controller 105 may be a microcontroller on a single integrated circuit containing a processor core, memory, inputs, and outputs. For example, controller 105 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 105 may be a combination of one or more analog components and one or more digital components.

Load 120 may be configured to receive current or power from a secondary transformer winding. For example, load 120 may include LEDs. LEDs may refer to any suitable semiconductor light source. In some examples, LEDs may be dimmable. For instance, a light intensity output by an LED may reduce as an average power received at the LED is reduced and a light intensity output by an LED may increase as an average power received at the LED is increased. In some examples, an LED may include a p-n junction configured to emit light when activated. In a first exemplary application, load 120 may be included in a headlight assembly for automotive applications. For instance, load 120 may be a matrix of light emitting diodes to light a road ahead of a vehicle. As used herein, a vehicle may refer to motorcycles, trucks, boats, golf carts, snowmobiles, heavy machines, or any type of vehicle that uses directional lighting. In a second exemplary application, load 120 may be any grouping of LEDs utilized for commercial, home, or another type of lighting. Load 120 may include an inductive load The amount of current or power supplied to load 120 may be controlled by controller 105. Controller 105 may be configured to define a set point which may alter the target current or the target power delivered to the primary transformer winding, and thus altering the power emitted at the secondary transformer winding configured to be delivered to the load. In one example, load 120 may include one or more LEDs, and the amount of power delivered to the load is indicative of the light intensity of the LEDs.

Dimming circuit 140 may be configured to produce a signal 150 including first information and second information. Dimming circuit 140 may be further configured to transmit a signal 150 across a galvanic isolation barrier 170 to controller 105. In some examples, dimming circuit 140 may include an analog circuit. For example, dimming circuit 140 may include one or more processors, including one or more microprocessors, DSPs, ASICs, FPGAs, or any other equivalent integrated or discrete logic circuitry, as well as any combinations of such components. In some examples, dimming circuit 140 may be a combination of one or more analog components and one or more digital components. In an example, dimming circuit 140 may include a pulse-width modulator configured to produce and customize select parameters of a pulse modulation signal. Parameters of the pulse modulation signal may include duty cycle and frequency. Dimming circuit 140 may be configured to be powered by an auxiliary transformer coil. In an example, signal 150 is the pulse modulation signal.

Signal 150 may be transmitted from dimming circuit 140 to controller 105 across galvanic isolation barrier 170. For example, signal 150 may include a pulse modulation signal configured to be encoded with the first information and the second information. In one example, the first information may include a dimming voltage value, and the second information may include an output voltage of an auxiliary transformer winding. Either the first information or the second information may be encoded in the duty cycle of the pulse modulation signal, and either the first information or the second information may be encoded in the frequency of the pulse modulation signal. The duty cycle is the fraction of time in which the pulse modulation signal is active, and it is expressed in units of percentage. For example, if the period of a signal is 1 second, and the signal is active for 0.5 seconds each period, then the duty cycle is 50%. Frequency refers to the number of events that happen within a set amount of time, and frequency is expressed as the fraction of events/second, or Hertz (Hz). For example, if a signal performs 60 cycles in one second, then the frequency of the signal is 60 Hz.

Pulse modulation may include Pulse-Width Modulation (PWM), and Pulse-Frequency Modulation (PFM). For PWM, components of dimming circuit 140 may vary the duty cycle, and for PFM, components of dimming circuit 140 may vary the frequency. Furthermore, Pulse-Density Modulation (PDM) may encompass both PWM and PFM. PWM is a form of PDM in which the frequency of the pulse modulation signal is fixed while duty cycle is changed, and PFM is a form of PDM in which the duty cycle of the pulse modulation signal is fixed while frequency is changed.

AC input 160 may comprise an output from any suitable electrical grid. AC input 160 may be configured to provide a constant power supply to primary-side circuit 180. For example, the output may be ~120 VAC at ~60 Hz, ~230 VAC at ~50 Hz, or another voltage and frequency. In some examples, AC input 160 may be configured to supply a voltage in a first direction during a first half of a cycle and supply voltage in a second direction during a second half of the cycle, the first direction being opposite from the second direction. For instance, AC input 160 may be configured to supply a sine wave that includes a positive current (e.g., first direction) flowing from a first node of AC input 160 to a second node of AC input 160 during a first half (e.g., 0 to π) of a cycle of the sine wave and a negative current (e.g., second direction) flowing from the second node of AC input 160 to the first node of AC input 160 during a second half (e.g., π to 2π) of the cycle of the sine wave.

Galvanic isolation barrier 170 may include an electrical isolation barrier. For example, dimming circuit 140 may be isolated from the rest of the system by galvanic isolation barrier 170. Galvanic isolation splits an electrical system into two or more parts, and the ground potential of each isolated part is set at a different value. This prevents unwanted current from flowing between two sections of the system via ground conductors, an event known as a ground loop. Therefore, galvanic isolation barriers may be used to prevent isolated electrical systems from creating electrical noise in neighboring isolated systems. Furthermore, galvanic isolation barrier 170 may increase the safety of system 11. For example, galvanic isolation barrier 170 may protect users from exposure to high voltages in dimming circuit 140. Electric circuits separated by a galvanic isolation barrier must communicate with each other using non-electrical signals. For example, dimming circuit 140 may be configured to transmit signal 150 to controller 105 across galvanic isolation barrier 170 via an opto-isolator. An opto-isolator is a device which may be configured to convert an electrical signal to an optical signal, transmit the optical signal over the galvanic isolation barrier, and restore the optical signal to an electrical signal after it has crossed the barrier. Communication across galvanic isolation barrier 170 may also be achieved using acoustic signals, mechanical signals, or any other non-electric signal.

In another example, dimming circuit 140 may be configured to transmit signal 150 to controller 105 across galvanic isolation barrier 170 via a grouping of two opto-isolators. For instance, a first opto-isolator may be configured to transmit the first information across galvanic isolation barrier 170, and a second opto-isolator may be configured to transmit the second information across galvanic isolation barrier 170.

Primary-side circuit 180 may be configured to receive an AC voltage from AC source 160 and provide a rectified AC voltage to one or more other components of system 100. For example, primary-side circuit 180 may be configured to supply electrical power to energize a primary winding of a transformer. Primary-side circuit 180 may also be configured to control the power delivered to load 120 and controller 105. Primary-side circuit 180 may include a rectifier and a flyback integrated circuit.

Figure 2:
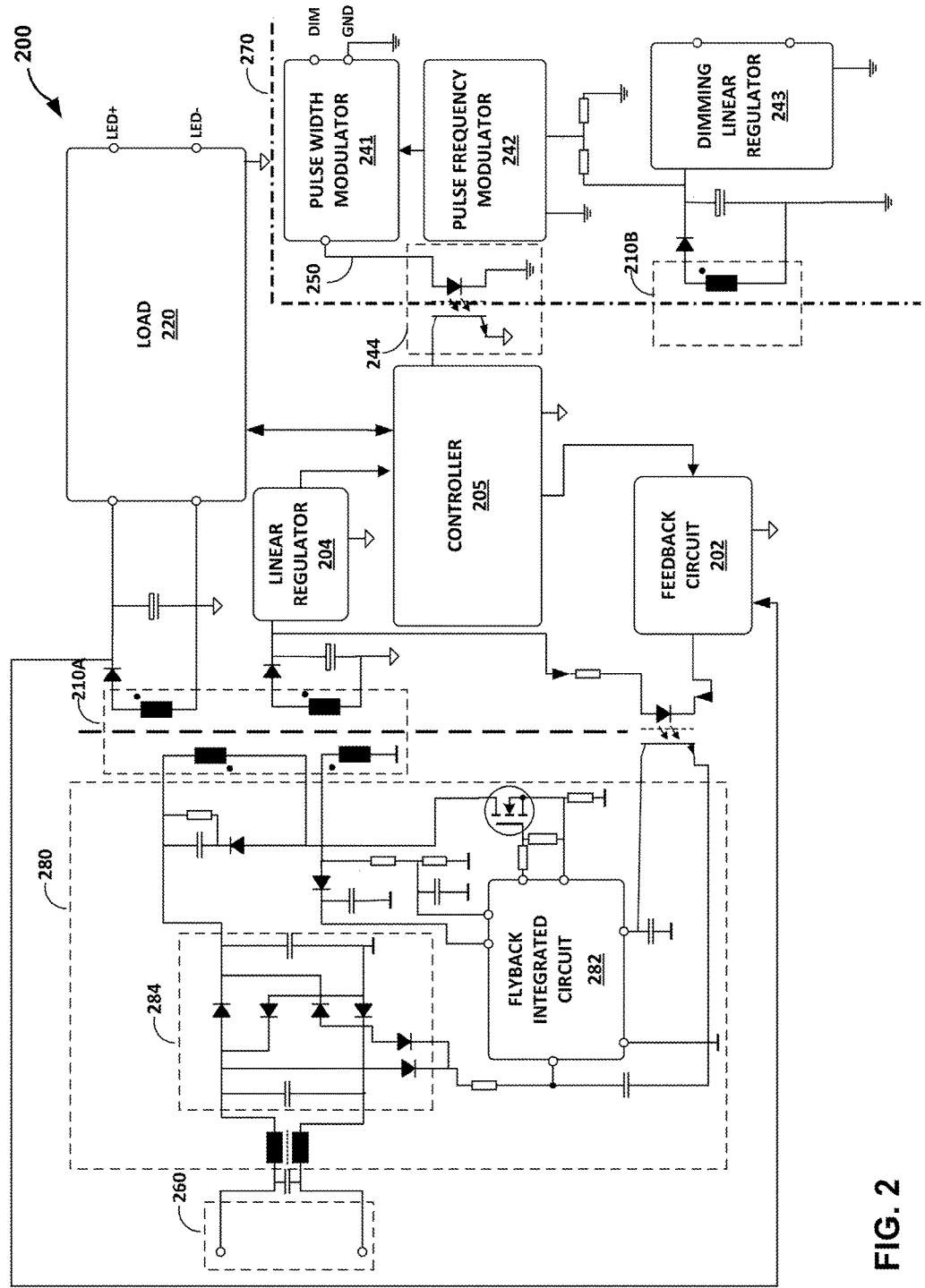
FIG. 2 is a block diagram of an LED driver circuit, in accordance with one embodiment.

FIG. 2 is a block diagram of an LED driver circuit 200, in accordance with one embodiment. As illustrated, circuit 200 includes feedback circuit 202, linear regulator 204, controller 205, transformer 210A, auxiliary transformer winding 210B, load 220, pulse-width modulator 241, pulse-frequency modulator 242, dimming linear regulator 243, opto-isolator 244, signal 250, AC input 260, galvanic isolation barrier 270, primary-side circuit 280, flyback integrated circuit 282, and rectifier 284. Controller 205 may be an example of controller 105 of FIG. 1. Load 220 may be an example of Load 120 of FIG. 1. Signal 250 may be an example of signal 150 of FIG. 1. AC input 260 may be an example of AC input 160 of FIG. 1. Galvanic isolation barrier 270 may be an example of galvanic isolation barrier 170 of FIG. 1. Primary-side circuit 280 may be an example of primary-side circuit 180 of FIG. 1.

Feedback circuit 202 may include one or more processors which may be configured to receive a signal from controller 205 and receive a signal including the output voltage of the secondary winding of transformer 210A. Feedback circuit 202 may be configured to process the signal from controller 205 and the output voltage of the secondary winding of transformer 210A, and produce a signal which may be transmitted to primary-side circuit 280. In one example, feedback circuit 202 may transmit the signal to flyback integrated circuit 282, which may be a component of primary-side circuit 280.

In some examples, feedback circuit 202 may include an analog circuit. In some examples, feedback circuit 202 may be a microcontroller on a single integrated circuit containing a processor core, memory, inputs, and outputs. For example, feedback circuit 202 may include one or more processors, including one or more microprocessors, DSPs, ASICs, FPGAs, or any other equivalent integrated or discrete logic circuitry, as well as any combinations of such components. In some examples, feedback circuit 202 may be a combination of one or more analog components and one or more digital components.

Linear regulator 204 may be configured to maintain a constant target output voltage. In some cases, the output voltage of the secondary coil of transformer 210A may vary over time, which is not optimal for the operation of circuit 200. Circuit operation is optimized when a constant voltage is powering controller 205. For example, linear regulator 204 may include a voltage divider network which is configured to release the difference between the input voltage and the output regulated voltage as waste heat. In another example, linear regulator 204 may include a series regulator configured to alter resistance according to the input voltage, in order to maintain a constant output voltage. In another example, linear regulator 204 may include a shunt regulator, which may be configured to alter the current flowing through the regulator in order to maintain a constant output voltage. Linear regulator 204 may be configured to include a custom target output voltage. For example, the target output voltage may be set to 3.3V.

Controller 205 may be configured to control load 220, wherein load 220 may include one or more LEDs. For instance, controller 205 may be configured to define a current set point or a power set point, wherein the set point determines the current or power delivered to load 220, which in turn may determine the light intensity output of load 220. In some examples, controller 205 may include an analog circuit. In some examples, controller 205 may be a microcontroller on a single integrated circuit containing a processor core, memory, inputs, and outputs. For example, controller 205 may include one or more processors, including one or more microprocessors, DSPs, ASICs, FPGAs, or any other equivalent integrated or discrete logic circuitry, as well as any combinations of such components. In some examples, controller 205 may be a combination of one or more analog components and one or more digital components.

Furthermore, controller 205 may be configured to be powered by a secondary winding of transformer 210A, wherein the output voltage of transformer 210A may be maintained at a steady value by linear regulator 204. Controller 205 may be configured to receive a signal 250 including first information and second information from pulse-width modulator 241 across galvanic isolation barrier 270 via opto-isolator 244. Further, Controller 205 may process signal 250 and produce a current or power set point which may determine the amount of current delivered to the primary windings of transformer 210A via feedback circuit 202 and flyback integrated circuit 282, which may in turn determine the amount of current delivered to load 220.

Transformer 210 may be configured to transfer electrical energy between two isolated circuits via electromagnetic induction. For example, transformer 210 may include two or more inductors ("windings") placed in close proximity. When a current is run through one or more primary windings connected to a primary circuit, an electromagnetic field is induced, which may create a current in one or more secondary windings which may be used to power a secondary circuit. The ratio of turns between the primary and the secondary inductors may be indicative of the ratio of the voltage across the primary windings and the voltage across the secondary windings. Transformer 210 may be selected to have a suitable turns ratio between the primary-side windings and the secondary-side windings. Furthermore, transformer 210 may be selected to have a suitable turns ratio between auxiliary winding 210B to secondary winding 210A.

Transformer 210A may include one or more primary windings and one or more secondary windings. The primary windings of transformer 210A may be configured to be powered by primary-side circuit 280. The secondary windings of transformer 210A may be configured to power load 220 and controller 205. Controller 205 may be configured to control the amount of current supplied to the primary windings of transformer 210A via feedback circuit 202 and primary-side circuit 280. By extension, controller 205 may be configured to control the amount of current supplied to load 220.

Auxiliary transformer winding 210B may include one or more secondary windings. Auxiliary transformer winding 210B may be configured to be powered by the primary windings of transformer 210A, and auxiliary transformer winding 210B may be configured to supply power to dimming linear regulator 243, pulse frequency modulator 242, and pulse-width modulator 241. The output voltage of auxiliary transformer winding 210B may be controlled by controller 205 via feedback circuit 202 and primary-side circuit 280. The output voltage value of auxiliary transformer winding 210B may be transmitted to controller 205 across galvanic isolation barrier 270 via opto-isolator 244.

Load 220 may be configured to receive a current or power from a secondary winding of transformer 210A. For example, load 220 may include LEDs. LEDs may refer to any suitable semiconductor light source. In some examples, LEDs may be dimmable. For instance, a light intensity output by an LED may reduce as an average power received at the LED is reduced and a light intensity output by an LED may increase as an average power received at the LED is increased. In some examples, an LED may include a p-n junction configured to emit light when activated. In an exemplary application, load 220 may be included in a headlight assembly for automotive applications. For instance, load 220 may be a matrix of light emitting diodes to light a road ahead of a vehicle. As used herein, a vehicle may refer to motorcycles, trucks, boats, golf carts, snowmobiles, heavy machines, or any type of vehicle that uses directional lighting. In another exemplary application, load 220 may include any grouping of LEDs utilized for commercial, home, or another type of lighting.

The amount of current or power supplied to load 220 may be controlled by controller 205. Controller 205 may be configured to define a set point which may alter the target current or the target power delivered to the primary winding of transformer 210A, and thus altering the power emitted at the secondary winding of transformer 210A configured to be delivered to the load. In one example, load 220 may include one or more LEDs, and the amount of power delivered to the load is indicative of the level of brightness of the LEDs.

Pulse-width modulator 241 may be configured to produce a pulse modulation signal. In one case, signal 250 may include PWM. For example, pulse-width modulator 241 may be configured to accept an input dimming voltage value (DIM), and encode the dimming voltage value into the duty cycle of signal 250. In an example, the duty cycle of the pulse modulation signal may include the first or second information.

Pulse-frequency modulator 242 may be configured to employ PFM to set a frequency of signal 250 emitted from pulse-wave modulator 241. For example, pulse-frequency modulator 241 may be configured to encode the output voltage of auxiliary transformer winding 210B into the frequency of signal 250. In an example, the frequency may include the first or second information.

Dimming linear regulator 243 may be configured to maintain a constant target output voltage. In some cases, the output voltage of auxiliary transformer winding 210B may vary over time, which is not ideal for the operation of circuit 200. Circuit operation is optimized when a constant voltage is powering controller pulse frequency modulator 242 and pulse-width modulator 241. For example, dimming linear regulator 243 may include a voltage divider network which is configured to release the difference between the input voltage and the output regulated voltage as waste heat. In another example, dimming linear regulator 243 may include a series regulator configured to alter resistance according to the input voltage, in order to maintain a constant output voltage. In another example, dimming linear regulator 243 may include a shunt regulator, which may be configured to alter the current flowing through the regulator in order to maintain a constant output voltage. Dimming linear regulator 243 may be configured to include a custom target output voltage. For instance, the target output voltage may be set to 24.5V. Since dimming linear regulator 243 must waste power if the output voltage of auxiliary transformer winding 210B deviates from the target output voltage of dimming linear regulator 243, controller 205 may be configured to control the output voltage of auxiliary transformer winding 210B in order to optimize the performance of dimming linear regulator 243.

Opto-isolator 244 may include a device configured to convert signal 250 to an optical signal, transmit the optical signal over galvanic isolation barrier 270, and restore the optical signal to an electrical signal after it has crossed the barrier. Communication across galvanic isolation barrier 270 may also be achieved using acoustic signals, mechanical signals, or any other non-electric signal.

Signal 250 may be transmitted from pulse-wave modulator 241 to controller 205 across galvanic isolation barrier 270. For example, signal 250 may include a pulse modulation signal configured to be encoded with the first information and the second information. In one example, the first information may include dimming voltage value (DIM), and the second information may include the output voltage of auxiliary transformer winding 210B. Either the first information or the second information may be encoded in the duty cycle of the pulse modulation signal, and either the first information or the second information may be encoded in the frequency of the pulse modulation signal.

In one example, the input dimming voltage value may range from 0-10V. The dimming voltage value may be encoded as the duty cycle of signal 250, wherein the duty cycle and the dimming voltage value have an approximately linear relationship. For instance, if the dimming voltage value is set to 10V, the duty cycle of signal 250 is set to 100%, and if the dimming voltage value is set to 5V, the duty cycle of signal 250 is set to 50%. Pulse-width modulator 241 may be configured to set the duty cycle of signal 250. Controller 205 may be configured to process signal 250 and obtain the dimming voltage value. Controller 205 may be further configured to control the power being delivered to load 220 based on the dimming voltage value.

In another example, the duty cycle and the dimming voltage value have an inversely linear relationship. For instance, if the dimming voltage value is set to 8V, the duty cycle of signal 250 is set to 20%, and if the dimming voltage value is set to 2V, the duty cycle of signal 250 is set to 80%.

In another example, the relationship between the duty cycle and the dimming voltage is not linear. As the dimming voltage is increased, the duty cycle may change exponentially, inverse exponentially, or in another manner.

As discussed above, the output voltage of auxiliary transformer winding 210B may be encoded as the frequency of signal 250. Dimming linear regulator 243 is tasked to maintain an output voltage of 24 V. In the interest of keeping the efficiency of dimming linear regulator 243 at a maximum, circuit 200 may be configured to use feedback control in order to stabilize output voltage of auxiliary transformer winding 210B close to 24.5V. In this case, dimming linear regulator 243 may not have to waste much power in order to regulate 24.5V to a flatline 24V. In this example, the output voltage of auxiliary transformer winding 210B may be encoded into signal 250 by pulse-frequency modulator 242. If the output voltage is greater than 24.5V, pulse-frequency modulator 242 may be configured to set the frequency at 1 kHz. If the output voltage is exactly 24.5V, pulse-frequency modulator 242 may be configured to set the frequency at 1.5 kHz. If the output voltage is less than 24.5V, pulse-frequency modulator 242 may be configured to set the frequency at greater than 1.5 kHz. Controller 205 may be configured to process signal 250 and obtain the output voltage of auxiliary transformer winding 210B. Furthermore, controller 205 may apply this data in order to control the output voltage of auxiliary transformer winding 210B so that it rests close to 24.5V.

In the event that the LEDs of load 220 are turned off and the dimming circuit components are in standby, the dimming voltage value may be set to 0V. Current consumption from auxiliary transformer winding 210B must be minimized during standby, so in this example the duty cycle of the pulse modulation signal may be set to 3% or 0%. Since the output voltage of auxiliary transformer winding 210B must always be stabilized, the duty cycle of the pulse modulation signal may be configured to be 3% when the dimming voltage value is 0V. This is because a pulse modulation signal with a duty cycle of 0% is simply a flat line, and cannot include a frequency. Therefore, in order to ensure that the controller may receive the second information including the output voltage of the auxiliary transformer winding, the duty cycle of signal 250 may be greater than 0%, even when the dimming voltage value is 0V.

AC input 260 may comprise an output from any suitable electrical grid. AC input 260 may be configured to provide a constant power supply to primary-side circuit 280. For example, the output may be ~120 VAC at ~60 Hz, ~230 VAC at ~50 Hz, or another voltage and frequency. In some examples, AC input 260 may be configured to supply a voltage in a first direction during a first half of a cycle and supply voltage in a second direction during a second half of the cycle, the first direction being opposite from the second direction. For instance, AC input 260 may be configured to supply a sine wave that includes a positive current (e.g., first direction) flowing from a first node of AC input 260 to a second node of AC input 260 during a first half (e.g., 0 to $\pi$) of a cycle of the sine wave and a negative current (e.g., second direction) flowing from the second node of AC input 260 to the first node of AC input 260 during a second half (e.g., π to 2π) of the cycle of the sine wave.

Galvanic isolation barrier 270 may include an electrical isolation barrier. For example, the dimming circuit components may be isolated from the rest of the system by galvanic isolation barrier 270. Galvanic isolation splits an electrical system into two or more parts, and the ground potential of each isolated part is set at a different level. This prevents unwanted current from flowing between two sections of the system via ground conductors, an event known as a ground loop. Therefore, galvanic isolation barriers prevent isolated electrical systems from creating electrical noise in neighboring isolated systems. Furthermore, galvanic isolation barrier 270 may increase the safety of circuit 200. For example, galvanic isolation barrier 270 may protect users from exposure to high voltages, such as the 24.5V output of auxiliary transformer winding 210B. Electric circuits separated by a galvanic isolation barrier must communicate with each other using non-electrical signals. For example, pulse-width modulator 241 may be configured to transmit signal 250 to controller 205 across galvanic isolation barrier 270 via opto-isolator 244.

Primary-side circuit 280 may be configured to receive an AC voltage from AC source 260 and provide a rectified AC voltage to one or more other components of system 200. For example, primary-side circuit 280 may be configured to supply electrical power to energize a primary winding of a transformer. Primary-side circuit 280 may also be configured to control the power delivered to load 220 and controller 205. Primary-side circuit 280 may include rectifier 284 and flyback integrated circuit 282.

Flyback integrated circuit 282 may be configured to be powered by the rectified AC voltage, and may be configured to control the amount of current delivered to the primary windings of transformer 210A. This may lead to the regulation of the output voltage of auxiliary transformer winding 210B. Furthermore, flyback integrated circuit 282 may be configured to monitor the output voltage of the secondary windings of transformer 210A configured to power controller 205 via direct sensing of the output voltage of the secondary windings of transformer 210A.

Rectifier 284 may be configured to receive an AC voltage from AC input 260 and provide a rectified AC voltage to one or more other components of circuit 200. For example, rectifier 284 may be configured to supply electrical power to energize the primary windings of transformer 210A. Rectifier 284 may include one or more semiconductor diodes, which are configured to allow current to flow in only one direction. Therefore, rectifier 284 may be configured to convert alternating current (current alternating between positive and negative directions) to direct current (current flowing in only one direction). Examples of rectifier 284 may include, but are not limited to, single-phase rectifier (e.g., bridge, half wave, full wave, or another single-phase rectifier), three-phase rectifier (e.g., half wave, full wave, bridge, or another three-phase rectifier), or another device configured to supply electrical power to energize the primary windings of transformer 210A.

Figure 3:
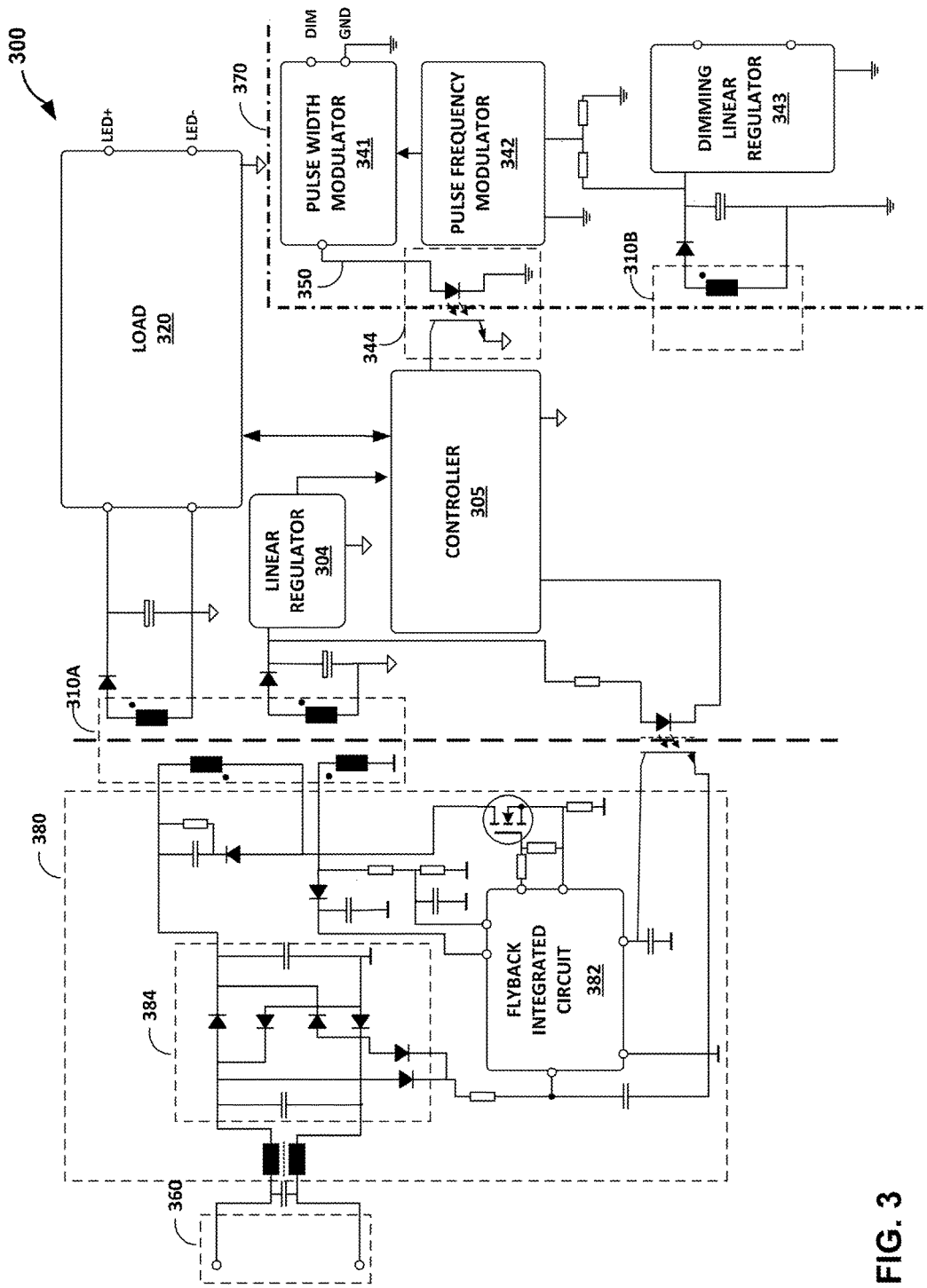
FIG. 3 is a block diagram of an LED driver circuit, in accordance with another embodiment.

FIG. 3 is a block diagram of an LED driver circuit 300, in accordance with another embodiment. As illustrated, circuit 300 includes, linear regulator 304, controller 305, transformer 310A, auxiliary transformer winding 310B, load 320, pulse-width modulator 341, pulse-frequency modulator 342, dimming linear regulator 343, opto-isolator 344, signal 250, AC input 360, galvanic isolation barrier 370, primary-side circuit 380, flyback integrated circuit 382, and rectifier 384. Linear regulator 304 may be an example of linear regulator 204 of FIG. 2. Controller 305 may be an example of controller 205 of FIG. 2. Transformer 310A may be an example of transformer 210A of FIG. 2. Auxiliary transformer winding 310B may be an example of auxiliary transformer winding 210B of FIG. 2. Load 320 may be an example of Load 220 of FIG. 2. Pulse-width modulator 341 may be an example of pulse-width modulator 241 of FIG. 2. Pulse-frequency modulator 342 may be an example of pulse-frequency modulator 242 of FIG. 2. Dimming linear regulator 343 may be an example of dimming linear regulator 243 of FIG. 2. Opto-isolator 344 may be an example of opto-isolator 244 of FIG. 2. Signal 350 may be an example of signal 250 of FIG. 2. AC input 360 may be an example of AC input 260 of FIG. 2. Galvanic isolation barrier 370 may be an example of galvanic isolation barrier 270 of FIG. 2. Primary-side circuit 380 may be an example of primary-side circuit 280 of FIG. 2. Flyback integrated circuit 382 may be an example of flyback integrated circuit 282 of FIG. 2. Rectifier 384 may be an example of rectifier 284 of FIG. 2.

Circuit 300 may be substantially similar to Circuit 200 of FIG. 2 except that a feedback circuit configured to accept a feedback signal from controller 305 and transformer 310A is not present in circuit 300. For instance, in circuit 300, controller 305 transmits a feedback signal directly to primary-side circuit 380 without passing the feedback signal through a feedback circuit. In this sense, circuit 300 contains slightly fewer components than circuit 200, and may be configured to consume less power than circuit 200.

Figure 4:
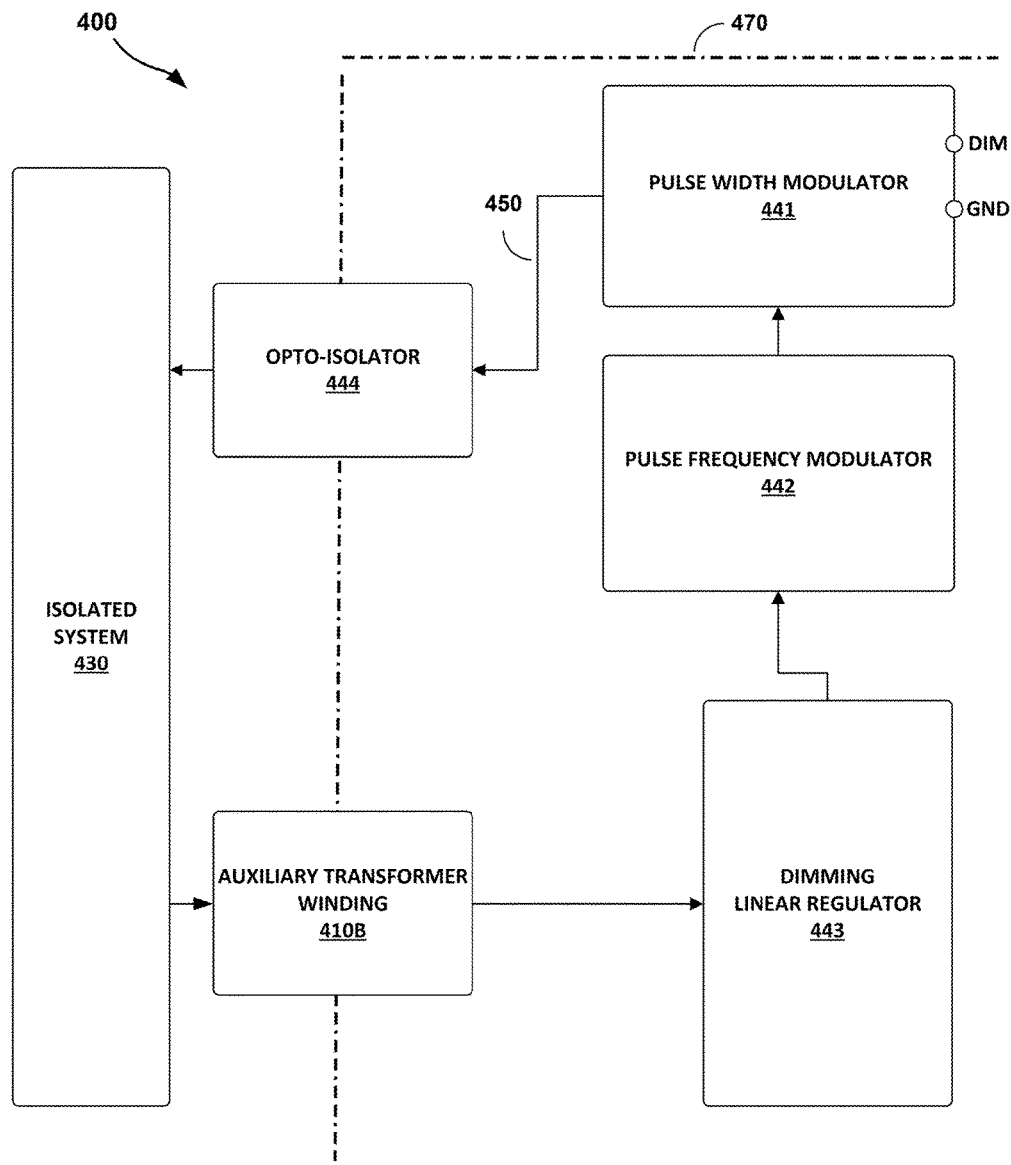
FIG. 4 is a block diagram illustrating an exemplary system for dimming circuit isolation, in accordance with one or more techniques of this disclosure.

FIG. 4 is a block diagram illustrating an exemplary system 400 for dimming circuit isolation, in accordance with one or more techniques of this disclosure. As illustrated, circuit 400 includes auxiliary transformer winding 410B, isolated system 430, pulse-width modulator 441, pulse-frequency modulator 442, dimming linear regulator 443, opto-isolator 444, signal 450, and galvanic isolation barrier 470. Auxiliary transformer winding 410B may be an example of auxiliary transformer winding 210B of FIG. 2. Pulse-width modulator 441 may be an example of pulse-width modulator 241 of FIG. 2. Pulse-frequency modulator 442 may be an example of pulse-frequency modulator 242 of FIG. 2. Dimming linear regulator 443 may be an example of dimming linear regulator 243 of FIG. 2. Opto-isolator 444 may be an example of opto-isolator 244 of FIG. 2. Signal 450 may be an example of signal 250 of FIG. 2. Galvanic isolation barrier 470 may be an example of galvanic isolation barrier 270 of FIG. 2.

Auxiliary transformer winding 410B may include one or more secondary windings. Auxiliary transformer winding 410B may be configured to be powered by one or more primary transformer windings of isolated system 430, and auxiliary transformer winding 410B may be configured to supply power to dimming linear regulator 443, pulse-frequency modulator 442, and pulse-width modulator 441. The output voltage of auxiliary transformer winding 410B may be controlled by isolated system 430. The output voltage value of auxiliary transformer winding 410B may be transmitted to isolated system 430 across galvanic isolation barrier 470 via opto-isolator 444.

Isolated system 430 may be configured to receive signal 450 from pulse-width modulator 441 via opto-isolator 444. Isolated system 430 may include an electrical circuit. In some examples, isolated system 430 may include one or more processors, including one or more microprocessors, DSPs, ASICs, FPGAs, or any other equivalent integrated or discrete logic circuitry, as well as any combinations of such components. In some examples, isolated system 430 may be a combination of one or more analog components and one or more digital components. Furthermore, isolated system 430 may include analog circuit components including, but not limited to, capacitors, resistors, inductors, diodes, and transformers. One or more processors of isolated system 430 may be configured to process signal 450 and obtain first and second information. In one example, the second information may include an output voltage across auxiliary transformer winding 410B. Furthermore, one or more processors of isolated system 430 may be configured to control the output voltage across auxiliary transformer winding 410B based on the second information.

Pulse-width modulator 441 may be configured to produce a pulse modulation signal. In one case, signal 450 may include PWM. For example, pulse-width modulator 441 may be configured to accept an input dimming voltage value (DIM), and encode the dimming voltage value into the duty cycle of signal 450. In an example, the duty cycle of the pulse modulation signal may include the first or second information.

In other examples, pulse-width modulator 441 may be configured to encode other dimming information into the duty cycle of PWM signal 450. For example, the other dimming information may include Digital Addressable Lighting Interface (DALI) control signals, and the other dimming information may also include phase-cut dimming information.

Pulse-frequency modulator 442 may be configured to employ PFM to set a frequency of signal 450 emitted from pulse-wave modulator 441. For example, pulse-frequency modulator 441 may be configured to encode the output voltage of auxiliary transformer winding 410B into the frequency of signal 450. In an example, the frequency may include the first or second information.

Dimming linear regulator 443 may be configured to maintain a constant target output voltage. In some cases, the output voltage of auxiliary transformer winding 410B may vary over time, which is not ideal for the operation of circuit 400. Circuit operation is optimized when a constant voltage is powering controller pulse-frequency modulator 442 and pulse-width modulator 441. For example, dimming linear regulator 443 may include a voltage divider network which is configured to release the difference between the input voltage and the output regulated voltage as waste heat. In another example, dimming linear regulator 443 may include a series regulator configured to alter resistance according to the input voltage, in order to maintain a constant output voltage. In another example, dimming linear regulator 443 may include a shunt regulator, which may be configured to alter the current flowing through the regulator in order to maintain a constant output voltage. Dimming linear regulator 443 may be configured to include a custom target output voltage. For example, the target output voltage may be set to 24.5V. Since dimming linear regulator 443 must consume power if the output voltage of auxiliary transformer winding 410B deviates from the target output voltage of dimming linear regulator 443, isolated system 430 may be configured to control the output voltage of auxiliary transformer winding 410B in order to optimize the performance of dimming linear regulator 443.

Opto-isolator 444 is a device which may be configured to convert signal 450 to an optical signal, transmit the optical signal over galvanic isolation barrier 470, and restore the optical signal to an electrical signal after it has crossed the barrier. Communication across galvanic isolation barrier 470 may also be achieved using acoustic signals, mechanical signals, or any other non-electric signal.

Signal 450 may be transmitted from pulse-wave modulator 441 to isolated system 430 across galvanic isolation barrier 470. For example, signal 450 may include a pulse modulation signal configured to be encoded with the first information and the second information. In one example, the first information may include dimming voltage value (DIM), and the second information may include the output voltage of auxiliary transformer winding 410B. Either the first information or the second information may be encoded in the duty cycle of the pulse modulation signal, and either the first information or the second information may be encoded in the frequency of the pulse modulation signal.

Galvanic isolation barrier 470 may include an electrical isolation barrier. For example, the dimming circuit components may be isolated from the rest of the system by galvanic isolation barrier 470. Galvanic isolation splits an electrical system into two or more parts, and the ground potential of each isolated part is set at a different level. This prevents unwanted current from flowing between two sections of the system via ground conductors, an event known as a ground loop. Therefore, galvanic isolation barriers prevent isolated electrical systems from creating electrical noise in neighboring isolated systems. Furthermore, galvanic isolation barrier 470 may increase the safety of system 400. For example, galvanic isolation barrier 470 may protect users from exposure to high voltages, such as the 24.5V output of auxiliary transformer winding 410B. Electric circuits separated by a galvanic isolation barrier must communicate with each other using non-electrical signals. In one example, pulse-width modulator 441 may be configured to transmit signal 450 to a controller across galvanic isolation barrier 470 via opto-isolator 444.

Figure 5:
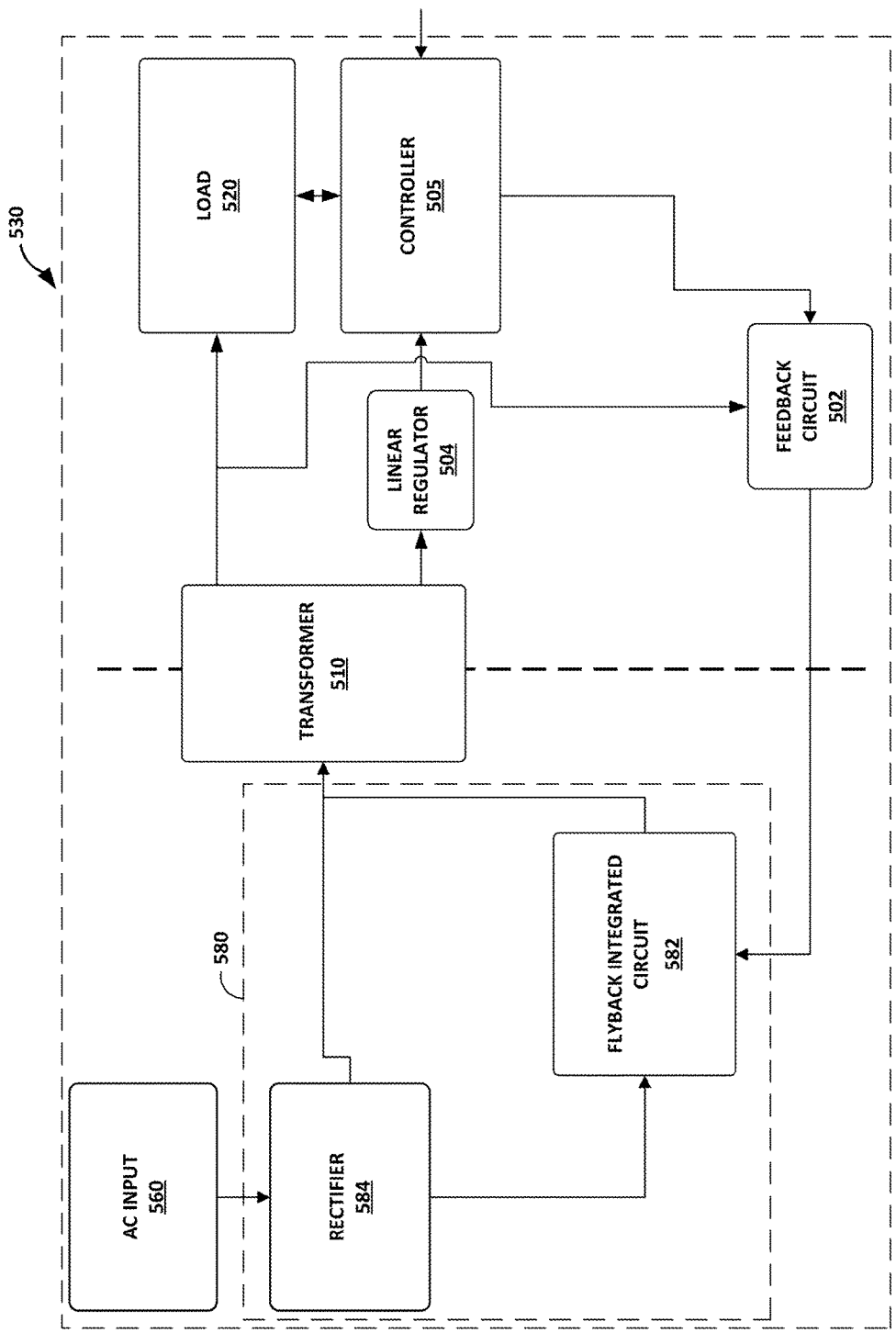
FIG. 5 is a block diagram illustrating an exemplary system for control of an LED driver, in accordance with one or more techniques of this disclosure.

FIG. 5 is a block diagram illustrating an exemplary system 530 for control of an LED driver, in accordance with one or more techniques of this disclosure. System 530 may be an example of isolated system 430 of FIG. 4. As illustrated in the example of FIG. 5, system 530 may include feedback circuit 502, linear regulator 504, controller 505, transformer 510, load 520, AC input 560, primary-side circuit 580, flyback integrated circuit 582, and rectifier 584. Linear regulator 504 may be an example of linear regulator 204 of FIG. 2. Controller 505 may be an example of controller 205 of FIG. 2. Transformer 510 may be an example of transformer 210A of FIG. 2. Load 520 may be an example of Load 220 of FIG. 2. AC input 560 may be an example of AC input 260 of FIG. 2. Primary-side circuit 580 may be an example of primary-side circuit 280 of FIG. 2. Flyback integrated circuit 582 may be an example of flyback integrated circuit 282 of FIG. 2. Rectifier 584 may be an example of rectifier 284 of FIG. 2.

Feedback circuit 502 may include one or more processors which may be configured to receive a signal from controller 505 and receive a signal including the output voltage of the secondary winding of transformer 510. Feedback circuit 502 may be configured to process the signal from controller 505 and the output voltage of the secondary winding of transformer 510, and produce a signal which may be transmitted to primary-side circuit 580. In one example, feedback circuit 502 may transmit the signal to flyback integrated circuit 582, which may be a component of primary-side circuit 580.

Linear regulator 504 may be configured to maintain a constant target output voltage. In some cases, the output voltage of the secondary coil of transformer 510 may vary over time, which is not ideal for the operation of system 530. Circuit operation is optimized when a constant voltage is powering controller 505. For example, linear regulator 504 may include a voltage divider network which is configured to release the difference between the input voltage and the output regulated voltage as waste heat. In another example, linear regulator 504 may include a series regulator configured to alter resistance according to the input voltage, in order to maintain a constant output voltage. In another example, linear regulator 504 may include a shunt regulator, which may be configured to alter the current flowing through the regulator in order to maintain a constant output voltage. Linear regulator 504 may be configured to include a custom target output voltage. For example, the target output voltage may be set to 3.3V.

Controller 505 may be configured to control load 520, wherein load 520 may include one or more LEDs. For instance, controller 505 may be configured to define a current set point or a power set point, wherein the set point determines the current or power delivered to load 520, which in turn may determine the light intensity output of load 520. In some examples, controller 505 may include an analog circuit. In some examples, controller 505 may be a microcontroller on a single integrated circuit containing a processor core, memory, inputs, and outputs. For example, controller 505 may include one or more processors, including one or more microprocessors, DSPs, ASICs, FPGAs, or any other equivalent integrated or discrete logic circuitry, as well as any combinations of such components. In some examples, controller 505 may be a combination of one or more analog components and one or more digital components.

Controller 505 may be configured to receive first information and second information from an isolated dimming circuit. The first information may be processed by controller 505, and applied by controller 505 to determine a current set point or a power set point. Primary-side circuit 580 may be configured to deliver power to the primary winding of transformer 510 based on the set point determined by controller 505, which in turn may determine the amount of power delivered to load 220. Furthermore, the second information may be processed by controller 505, and applied by controller 505 to control the amount of power delivered to the isolated dimming circuit via primary-side circuit 580 and transformer 510.

Transformer 510 may be configured to transfer electrical energy between two isolated circuits via electromagnetic induction. For example, transformer 510 may include two or more inductors ("windings") placed in close proximity. When a current is run through one or more primary windings connected to a primary circuit, an electromagnetic field is induced, which may create a current in one or more secondary windings which may be used to power a secondary circuit. The ratio of turns between the primary and the secondary inductors may be indicative of the ratio of the voltage across the primary windings and the voltage across the secondary windings. Transformer 510 may be selected to have a suitable turns ratio between the primary-side windings and the secondary-side windings.

The primary windings of transformer 510 may be configured to be powered by primary-side circuit 580. The secondary windings of transformer 510 may be configured to power load 520. Furthermore, the secondary windings of transformer 510 may be configured to power controller 505. As discussed above, controller 505 may be configured to control the amount of current supplied to the primary windings of transformer 510 via primary-side circuit 580. By extension, controller 505 may be configured to control the amount of current supplied to load 520.

Load 520 may be configured to receive a current or power from a secondary winding of transformer 510. For example, load 520 may include LEDs. LEDs may refer to any suitable semiconductor light source. In some examples, LEDs may be dimmable. For instance, a light intensity output by an LED may reduce as an average power received at the LED is reduced and a light intensity output by an LED may increase as an average power received at the LED is increased. In some examples, an LED may include a p-n junction configured to emit light when activated. In an exemplary application, load 520 may be included in a headlight assembly for automotive applications. For instance, load 520 may be a matrix of light emitting diodes to light a road ahead of a vehicle. As used herein, a vehicle may refer to motorcycles, trucks, boats, golf carts, snowmobiles, heavy machines, or any type of vehicle that uses directional lighting. In another exemplary application, load 520 may include any grouping of LEDs utilized for commercial, home, or another type of lighting.

The amount of current or power supplied to load 520 may be controlled by controller 505. Controller 505 may be configured to define a set point which may alter the target current or the target power delivered to the primary winding of transformer 510, and thus altering the power emitted at the secondary winding of transformer 510 configured to be delivered to the load. In one example, the amount of power delivered to the load is indicative of the level of brightness of one or more LEDs.

AC input 560 may be an output from any suitable electrical grid. AC input 560 may be configured to provide a constant power supply to primary-side circuit 580. For example, the output may be ~120 VAC at ~60 Hz, ~230 VAC at ~50 Hz, or another voltage and frequency. In some examples, AC input 560 may be configured to supply a voltage in a first direction during a first half of a cycle and supply voltage in a second direction during a second half of the cycle, the first direction being opposite from the second direction. For instance, AC input 560 may be configured to supply a sine wave that includes a positive current (e.g., first direction) flowing from a first node of AC input 560 to a second node of AC input 560 during a first half (e.g., 0 to $\pi$) of a cycle of the sine wave and a negative current (e.g., second direction) flowing from the second node of AC input 560 to the first node of AC input 560 during a second half (e.g., $\pi$ to $2\pi$) of the cycle of the sine wave.

Primary-side circuit 580 may be configured to receive an AC voltage from AC source 560 and provide a rectified AC voltage to one or more other components of system 530. For example, primary-side circuit 580 may be configured to supply electrical power to energize a primary winding of a transformer. Primary-side circuit 580 may also be configured to control the power delivered to load 520 and controller 505. Primary-side circuit 580 may include rectifier 584 and flyback integrated circuit 582.

Flyback integrated circuit 582 may be configured to be powered by the rectified AC voltage, and may be configured to control the amount of current delivered to the primary windings of transformer 510. Flyback integrated circuit 582 may be configured to monitor the output voltage of the secondary windings of transformer 510 configured to power controller 505 via direct sensing of the output voltage of the secondary windings of transformer 510.

Rectifier 584 may be configured to receive an AC voltage from AC input 560 and provide a rectified AC voltage to one or more other components of system 530. For example, rectifier 584 may be configured to supply electrical power to energize the primary windings of transformer 510. Rectifier 584 may include one or more semiconductor diodes, which are configured to allow current to flow in only one direction. Therefore, rectifier 584 may be configured to convert alternating current (current alternating between positive and negative directions) to direct current (current flowing in only one direction). Examples of rectifier 284 may include, but are not limited to, single-phase rectifier (e.g., bridge, half wave, full wave, or another single-phase rectifier), three-phase rectifier (e.g., half wave, full wave, bridge, or another three-phase rectifier), or another device configured to supply electrical power to energize the primary windings of transformer 210A.

Figure 6:
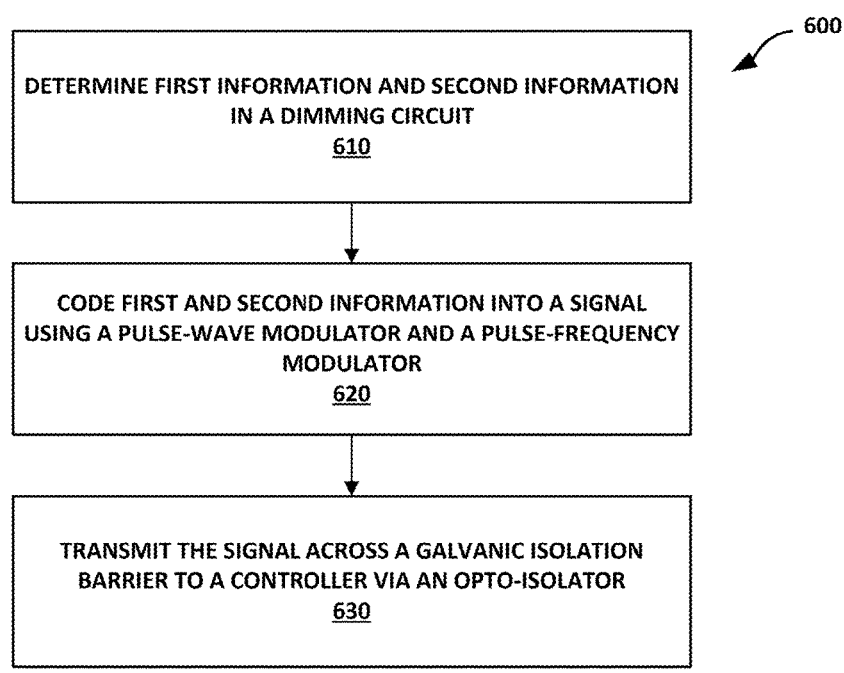
FIG. 6 is a first flow diagram consistent with techniques that may be performed by the system of FIG. 2, in accordance with this disclosure.

FIG. 6 is a first flow diagram 600 consistent with techniques that may be performed by the circuit 200 of FIG. 2, in accordance with this disclosure. For purposes of illustration only, FIG. 6 is described below within the context of system 100 of FIG. 1, circuit 200 of FIG. 2, circuit 300 of FIG. 3, and system 400 of FIG. 4. However, the techniques described below can be used in any permutation, and in any combination, with controller 205, auxiliary transformer winding 210B, pulse-width modulator 241, pulse-frequency modulator 242, opto-isolator 244, signal 250, and galvanic isolation barrier 270.

In accordance with one or more techniques of this disclosure, pulse-width modulator 241 and pulse-frequency modulator 242 may determine first information and second information in a dimming circuit (610). Pulse-width modulator 241 may be configured to produce signal 250, which includes a pulse modulation signal. For example, circuit 200 may code first information and second information into signal 250 using pulse-wave modulator 241 and pulse-frequency modulator 242 (620). In one example, the first information may be represented by the duty cycle of signal 250, and the second information may be represented by the frequency of signal 250. After pulse-width modulator 241 and pulse-frequency modulator 242 produce signal 250, pulse-width modulator 241 may transmit signal 250 across galvanic isolation barrier 270 to controller 205 via opto-isolator 244 (630).

Figure 7:
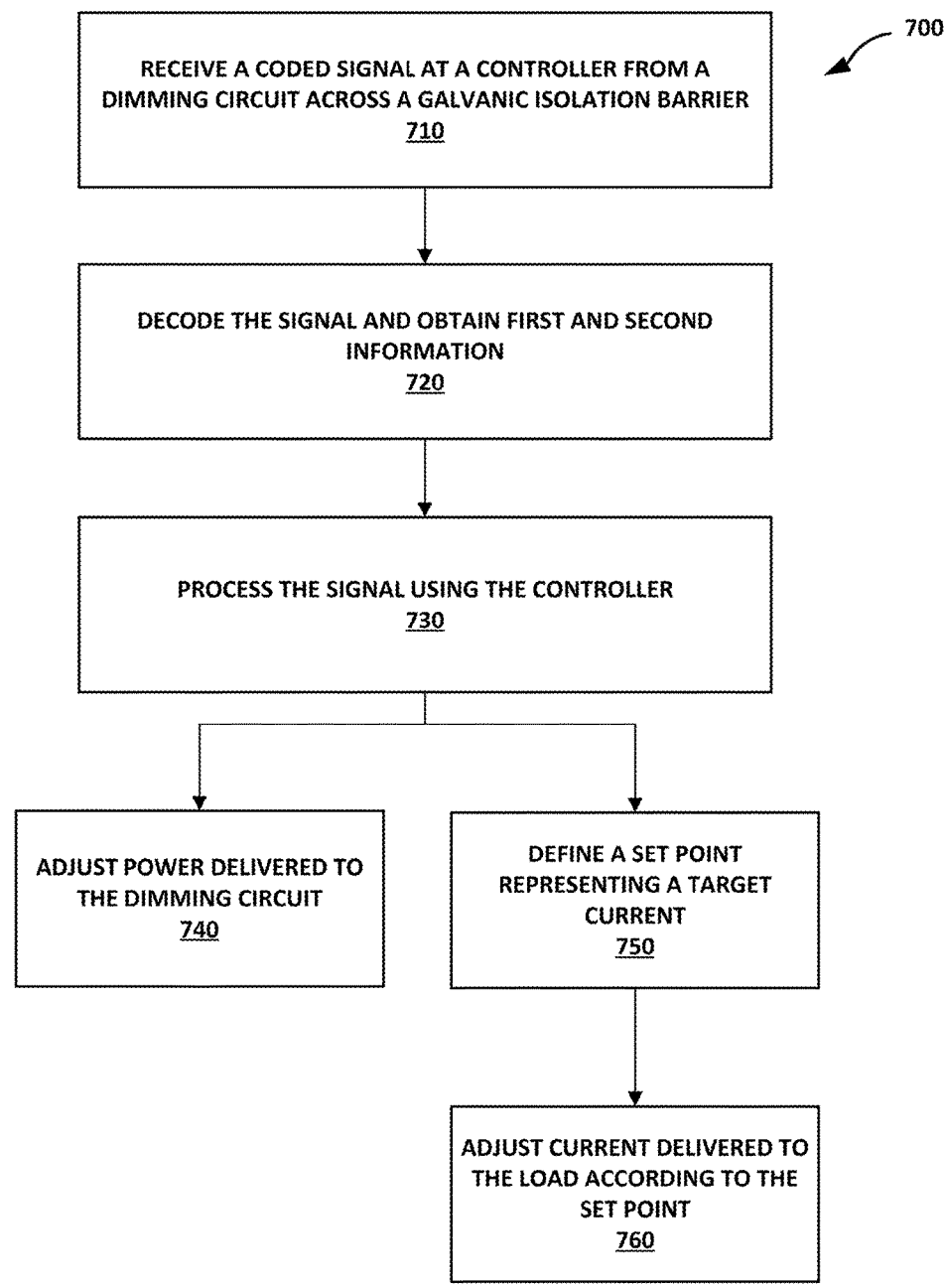
FIG. 7 is a second flow diagram consistent with techniques that may be performed by the system of FIG. 2, in accordance with this disclosure.

FIG. 7 is a second flow diagram 700 consistent with techniques that may be performed by the circuit 200 of FIG. 2, in accordance with this disclosure. For purposes of illustration only, FIG. 7 is described below within the context of system 100 of FIG. 1, circuit 200 of FIG. 2, circuit 300 of FIG. 3, system 400 of FIG. 4, and system 530 of FIG. 5. However, the techniques described below can be used in any permutation, and in any combination, with controller 205, transformer 210A, load 220, auxiliary transformer winding 210B, pulse-width modulator 241, opto-isolator 244, signal 250, galvanic isolation barrier 270, and primary-side circuit 280.

In accordance with one or more techniques of this disclosure, circuit 200 is configured to receive a coded signal at a controller from a dimming circuit across a galvanic isolation barrier (710). For example, controller 205 may be configured to receive a pulse modulation signal 250 including a duty cycle and a frequency, wherein signal 250 was transmitted from pulse-frequency modulator 241 to controller 250 across galvanic isolation barrier 270 via opto-isolator 244. In order to transmit signal 250 across galvanic isolation barrier 270, opto-isolator 244 was utilized so that an electrical signal would not create noise in the isolated electrical systems.

Controller 205 may be configured to decode the signal and obtain first and second information (720). For example, controller 205 may include one or more processors, including one or more microprocessors, DSPs, ASICs, FPGAs, or any other equivalent integrated or discrete logic circuitry, as well as any combinations of such components. One or more processors of controller 205 may be configured to obtain first and second information from signal 250. In some examples, signal 250 may include a pulse modulation signal, and the first information may be represented by a duty cycle and the second information may be represented by a frequency.

Circuit 200 may be configured to process the signal using the controller (730). One or more processors of controller 205 may be configured to process the first information and the second information, and control other components of circuit 200. For example, controller 205 may be configured to adjust power delivered to the dimming circuit (740) via primary-side circuit 280, transformer 210A, and auxiliary transformer winding 210B. Furthermore, one or more processors in controller 205 may be configured to define a set point representing a target current (750), and adjust current delivered to the load according to the set point (760). Current may be adjusted by controller 205 via primary-side circuit 280 and transformer 210A.

The disclosure above contemplates a pulse modulation signal that includes first information and second information, wherein the first information includes information defining a desired LED brightness and the second information includes information defining an output voltage of an auxiliary transformer winding. In other exemplary applications, however, the first information and the second information may include alternative types of information. Due to the nature of pulse modulation, it is possible for many types of information to be coded into a pulse modulation signal. For instance, information including a numerical value may be coded into a pulse modulation signal, because the frequency, duty cycle, amplitude, and other features of the pulse may be adjusted according to a numerical value. Furthermore, information which may be reduced to a numerical scale is also compatible with pulse modulation. For example, written text may be reduced to a binary scale (0s and 1s) and coded into a pulse modulation signal.

In another exemplary application, signal 250 of circuit 200 may include a pulse modulation signal. Signal 250 may include first information and second information, wherein the first information may include a desired LED brightness, and the second information may another type of information used for LED control. In this example, the second information may include color temperature information. Pulse-width modulator 241 and pulse-frequency modulator 242 may be configured to produce signal 250, and pulse-width modulator 241 may be configured to transmit signal 250 to controller 205 via opto-isolator 244. Furthermore, controller 250 may be configured to process signal 250 and obtain the first information and the second information. Controller 250 may be configured to apply the first information to define a current set point, and adjust current delivered load 220 via primary-side circuit 280, according to the current set point. The second information may be applied by controller 205 to adjust the color of light emitted from the LEDs of load 220. Color temperature may be defined by a numerical temperature scale configured to be correlated with a color scale, and controller 205 may be configured to use the numerical temperature value of the second information to alter the color of the LEDs.

Color temperature may refer to the temperature of a light-emitting object known as a black body. The color of light emitted from the black body may be a function of the temperature of the black body. For example, if the temperature of a black body is 1000° K, the color may be red, and if the temperature of a black body is 11500° K, the color may be blue. The intensity of light emitted from a black body increases as temperature is increased. Therefore, dimming of a black body lighting system can be accomplished by changing the temperature of a black body. While halogen light bulbs may be an example of black body radiation, LEDs do not emit light via black body radiation. However, a parameter known as correlated color temperature (CCT) may be applied to characterize light emitted from LED sources. CCT is best described as the temperature in which a black body would have to be heated in order to produce light at the same color and intensity as the LED in question.

The following examples may illustrate one or more aspects of the disclosure.

Example 1

A controller that controls one or more light-emitting diodes (LEDs), wherein the controller is configured to: receive an output voltage from a secondary transformer winding of a transformer; receive first information across a galvanic isolation barrier, wherein the first information comprises a desired LED brightness; receive second information across the galvanic isolation barrier, wherein the second information comprises an output voltage of an auxiliary transformer winding; and control the one or more LEDs based on the first information; control the output voltage of a secondary transformer winding and the output voltage of the auxiliary transformer winding based on the first information and the second information.

Example 2

The controller of example 1, wherein the first information and the second information are received across the galvanic isolation barrier via an opto-isolator.

Example 3

The controller of any combination of examples 1-2, wherein the desired LED brightness comprises a dimming voltage value.

Example 4

The controller of any combination of examples 1-3, wherein the desired LED brightness comprises a dimming pulse modulation duty cycle.

Example 5

The controller of any combination of examples 1-4, further configured to: define a set point based on the first information, the set point representing a target current value to be delivered to the LEDs; and regulate the output voltage of the auxiliary transformer winding based on the second information.

Example 6

The controller of any combination of examples 1-5, wherein the first information and the second information are encoded in a pulse modulation signal.

Example 7

The controller of any combination of examples 1-6, wherein the first information or the second information is encoded in a duty cycle of the pulse modulation signal.

Example 8

The controller of any combination of examples 1-7, wherein the first information or the second information is encoded in a frequency of the pulse modulation signal.

Example 9

The controller of any combination of examples 1-8, wherein the controller comprises an application-specific integrated circuit (ASIC) configured to: receive an electrical signal comprising the first information and the second information; and process the electrical signal.

Example 10

A circuit configured to: generate a signal comprising first information and second information, wherein the first information comprises a desired LED brightness, and wherein the second information comprises an output voltage of an auxiliary transformer winding; and transmit the signal to a controller over a galvanic isolation barrier.

Example 11

The circuit of example 10, wherein the first information and the second information are transmitted across the galvanic isolation barrier via an opto-isolator.

Example 12

The circuit of any combination of examples 10-11, wherein the desired LED brightness comprises a dimming voltage value.

Example 13

The circuit of any combination of examples 10-12, wherein the desired LED brightness comprises a dimming pulse modulation duty cycle.

Example 14

The circuit of any combination of examples 10-13, the circuit comprising: an auxiliary transformer winding configured to power components of the circuit; a pulse-width modulator configured to: accept a first and a second information, and produce the signal comprising the first information and the second information, wherein the pulse-width modulator is configured to set a duty cycle of the signal; a pulse-frequency modulator configured to set a frequency of the signal; and an opto-isolator configured to transmit the signal to the controller over the galvanic isolation barrier.

Example 15

The circuit of any combination of examples 10-14, wherein the signal comprises a pulse modulation signal.

Example 16

The circuit of any combination of examples 10-15, wherein the first information or the second information is encoded in a duty cycle of the pulse modulation signal.

Example 17

The circuit of any combination of examples 10-16, wherein the first information or the second information is encoded in a frequency of the pulse modulation signal.

Example 18

A system comprising: a primary transformer winding; an opto-isolator; a primary side circuit configured to provide a current to the primary transformer winding; a load comprising one or more light-emitting diodes (LEDs), wherein the load is configured to be powered by a secondary transformer winding; a circuit configured to be powered by an auxiliary transformer winding, wherein the circuit comprises: a regulator configured to stabilize an output voltage of the auxiliary transformer winding, and a pulse-width modulator configured to accept first information and second information, and produce a signal comprising the first information and the second information; and a controller, wherein the first information comprises a desired LED brightness, wherein the second information comprises an output voltage of the auxiliary transformer winding, wherein the pulse-width modulator is configured to transmit the signal to the controller via the opto-isolator, and wherein the controller is configured to: process the signal, and regulate the power transfer to the secondary transformer winding and to the auxiliary transformer winding.

Example 19

The system of example 18, wherein the desired LED brightness comprises a dimming voltage value.

Example 20

The system of any combination of examples 18-19, wherein the desired LED brightness comprises a dimming pulse modulation duty cycle.

Example 21

A controller that controls one or more light-emitting diodes (LEDs), wherein the controller is configured to: receive first information across a galvanic isolation barrier, wherein the first information defines at least one operation parameter of the LEDs; receive second information across the galvanic isolation barrier; and control the one or more LEDs based on the first and second information.

Example 22

The controller of example 21, wherein the first information comprises a desired LED brightness.

Example 23

The controller of any combination of examples 21-22, wherein the second information comprises color temperature information.

Example 24

A circuit configured to: generate a signal comprising first information and second information, wherein the first information defines at least one operation parameter of the LEDs; and transmit the signal to a controller over a galvanic isolation barrier.

Example 25

The circuit of example 24, wherein the first information comprises a desired LED brightness.

Example 26

The circuit of any combination of examples 24-25, wherein the second information comprises color temperature information.

The techniques described in this disclosure may be implemented, at least in part, in hardware, software, firmware, or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:

1. A controller that controls one or more light-emitting diodes (LEDs), wherein the controller is configured to:
   receive an output voltage from a secondary transformer winding of a transformer;
   receive first information across a galvanic isolation barrier, wherein the first information comprises a desired LED brightness;
   receive second information across the galvanic isolation barrier, wherein the second information comprises an output voltage of an auxiliary transformer winding; and
   control the one or more LEDs based on the first information;
   control the output voltage of a secondary transformer winding and the output voltage of the auxiliary transformer winding based on the first information and the second information.

2. The controller of claim 1, wherein the first information and the second information are received across the galvanic isolation barrier via an opto-isolator.

3. The controller of claim 1, wherein the desired LED brightness comprises a dimming voltage value.

4. The controller of claim 1, wherein the desired LED brightness comprises a duty cycle of a pulse modulation signal.

5. The controller of claim 1, further configured to:
define a set point based on the first information, the set point representing a target current value to be delivered to the LEDs; and
regulate the output voltage of the auxiliary transformer winding based on the second information.

6. The controller of claim 1, wherein the first information and the second information are encoded in a pulse modulation signal.

7. The controller of claim 6, wherein the first information or the second information is encoded in a duty cycle of the pulse modulation signal.

8. The controller of claim 6, wherein the first information or the second information is encoded in a frequency of the pulse modulation signal.

9. The controller of claim 1, wherein the controller comprises an application-specific integrated circuit (ASIC) configured to:
receive an electrical signal comprising the first information and the second information; and
process the electrical signal.

10. A circuit configured to:
generate a signal comprising first information and second information,
wherein the first information comprises a desired LED brightness, and
wherein the second information comprises an output voltage of an auxiliary transformer winding; and
transmit the signal to a controller over a galvanic isolation barrier such that the first information comprising the desired LED brightness is transmitted over the galvanic isolation barrier via the signal and the second information comprising the output voltage of the auxiliary transformer winding is also transmitted over the galvanic isolation barrier via the signal.

11. The circuit of claim 10, wherein the first information and the second information are transmitted across the galvanic isolation barrier via an opto-isolator.

12. The circuit of claim 10, wherein the desired LED brightness comprises a dimming voltage value.

13. The circuit of claim 10, wherein the desired LED brightness comprises a dimming pulse modulation duty cycle.

14. The circuit of claim 10, the circuit comprising:
an auxiliary transformer winding configured to power components of the circuit;
a pulse-width modulator configured to:
accept a first and a second information, and
produce the signal comprising the first information and the second information,
wherein the pulse-width modulator is configured to set a duty cycle of the signal;
a pulse-frequency modulator configured to set a frequency of the signal; and
an opto-isolator configured to transmit the signal to the controller over the galvanic isolation barrier.

15. The circuit of claim 10, wherein the signal comprises a pulse modulation signal.

16. The circuit of claim 15, wherein the first information or the second information is encoded in a duty cycle of the pulse modulation signal.

17. The circuit of claim 15, wherein the first information or the second information is encoded in a frequency of the pulse modulation signal.

18. A system comprising:
a primary transformer winding;
an opto-isolator;
a primary side circuit configured to provide a current to the primary transformer winding;
a load comprising one or more light-emitting diodes (LEDs), wherein the load is configured to be powered by a secondary transformer winding;
a circuit configured to be powered by an auxiliary transformer winding, wherein the circuit comprises:
a regulator configured to stabilize an output voltage of the auxiliary transformer winding, and
a pulse-width modulator configured to accept first information and second information, and produce a signal comprising the first information and the second information; and
a controller,
wherein the first information comprises a desired LED brightness,
wherein the second information comprises an output voltage of the auxiliary transformer winding,
wherein the pulse-width modulator is configured to transmit the signal to the controller via the opto-isolator, and
wherein the controller is configured to:
process the signal, and
regulate the power transfer to the secondary transformer winding and to the auxiliary transformer winding.

19. The system of claim 18, wherein the desired LED brightness comprises a dimming voltage value.

20. The system of claim 18, wherein the desired LED brightness comprises a dimming pulse modulation duty cycle.

* * * * *